United States Patent Office 3,646,008
Patented Feb. 29, 1972

3,646,008
BENZOTHIAZEPINE DERIVATIVES
Hiroshi Kugita, Osaka-fu, Satoshi Takeo, Omiya-shi, Masanori Sato, Toda-shi, and Taku Nagao, Omiya-shi, Japan, assignors to Tanabe Seiyaku Co., Ltd., Osaka, Japan
No Drawing. Filed Jan. 9, 1970, Ser. No. 1,897
Claims priority, application Japan, Jan. 25, 1969, 44/5,493
Int. Cl. C07d 43/40
U.S. Cl. 260—239.3
3 Claims

ABSTRACT OF THE DISCLOSURE 2-(4-methoxyphenyl)-3-hydroxy-5-(β-dimethylaminoethyl) - 2,3 - dihydro - 1,5 - benzothiazepin-4(5H)-one is reacted with a lower alkyl haloformate having the formula

X·COOR wherein X is a halogen atom and R is a lower alkyl radical. The reaction is conducted in the presence of a base. A benzothiazepine derivative having the formula

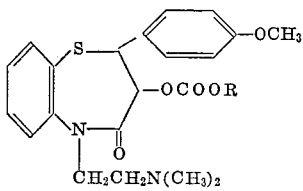

wherein R is as defined above, is produced. The benzothiazepine derivative and its pharmaceutically acceptable acid addition salts are useful as coronary vasodilators.

---

This invention relates to a novel benzothiazepine derivative and the preparation thereof. More particularly, it relates to 2-(4-methoxyphenyl)-3-lower alkoxycarbonyloxy-5-(β - dimethylaminoethyl) - 2,3 - dihydro - 1,5 - benzothiazepin-4(5H)-one and pharmaceutically acceptable acid addition salts thereof.

The benzothiazepine derivatives of the present invention are represented by the following formula:

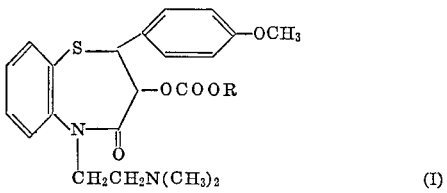

wherein R represents a lower alkyl radical.

It has now been found that the benzothiazepine derivative (I) and pharmaceutically acceptable acid addition salts thereof are useful as coronary vasodilators. For example, the compound (I) effectively ameliorates acute or chronic coronary symptoms in the adult man, such as, for example, coronary insufficiency, angina pectoris or cardiac infraction when intravenously administered in a dose of about 2 to about 5 mg., or when orally administered in a daily dose of about 30 to about 60 mg. At such a dose, the paroxysm of angina pectoris may be effectively prevented.

The bezothiazepine derivative (I) is remarkably low in toxicity. For example, the acute toxicity ($=LD_{50}$) of 2-(4 - methoxyphenyl) - 3 - ethoxycarbonyloxy - 5 - (β-dimethylaminoethyl)-2,3 - dihydro - 1,5 - benzothiazepin-4(5H)-one (hydrobromide), when administered to mice intravenously, is 55 mg./kg.

According to the present invention, the novel benzothiazepine derivative (I) can be prepared by reacting 2-(4 - methoxyphenyl) - 3 - hydroxy - 5 - (β-dimethylaminoethyl)-2,3-dihydro-1,5-benzothiazepin-4(5H)-one, i.e the compound represented by the formula

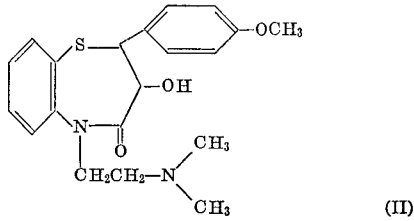

with a lower alkyl haloformate having the formula

X·COOR wherein X represents a halogen atom and R is as defined above.

The compound (II) is readily produced. For example, it may be produced by condensing 2-aminothiophenol with ethyl 2,3 - epoxy-3-(4 - methoxyphenyl) - proprionate to give 2-(4-methoxyphenyl) - 3 - hydroxy - 2,3 - dihydroxy-1,4-benzothiazepin-4(5H)-one, then reacting the alkali metal salt at the N-position of said product with β-dimethylaminoethyl chloride.

The reaction of the instant invention is preferably carried out in the presence of a base (e.g. pyridine, triethylamine, dimethylaniline). The reaction is normally carried out for a sufficient period of time at room temperature. However, it may also be carried out at an elevated temperature.

The thus obtained benzothiazepine derivative (I) can be converted into its acid-addition salt by treating it with an organic or inorganic acid (e.g. acetic acid, oxalic acid, malonic acid, tartaric acid, citric acid, lactic acid, aspartic acid, hydrochloric acid, hydrobromic acid, sulfuric acid, nitric acid, perchloric acid, etc.) in a suitable solvent (e.g. water, methanol, ethanol, etc.)

The benzothiazepine derivative (I) and pharmaceutically acceptable acid-addition salts thereof may be incorporated in pharmaceutical preparations in admixture with a pharmaceutical organic or inorganic carrier material that is suitable for enteral or parenteral application. Oral administration in a solid dosage form such as tablets, capsules, powders or in liquid dosage form such as suspensions, solutions, emulsions or syrups is particularly advantageous.

When the compounds (I) are to be administered in solid dosage form, conventional excipients (e.g. sodium citrate, lactose, microcrystalline cellulose, starch, etc.), lubricating agents (e.g. anhydrous silicic acid, hydrogenated castor oil, magnesium stearate, sodium lauryl sulfate, talc, etc.) and binding agents (e.g. starch paste, glucose, lactose, gum acacia, gelatin, mannitol, magnesium trisilicate, talc, etc.) can be used. When the componds (I) are to be administered in liquid dosage form conventional liquid carriers can be employed.

Practical and presently preferred embodiments of the present invention are illustratively shown in the following example.

EXAMPLE

A mixture of 1.5 g. of 2-(4-methoxyphenyl)-3-hydroxy-5 - (β - dimethylaminoethyl) - 2,3 - dihydro - 1,5 - benzothiazepin-4(5H)-one, 0.97 g. of ethyl chloroformate and 6 ml. of pyridine is allowed to stand overnight at room temperature. The reaction mixture is added to ice water. Precipitated crystals are collected by filtration. 1.49 g. of 2 - (4-methoxyphenyl)-2-ethoxycarbonyloxy-5-(β-dimethylaminoethyl) - 2,3 - dihydro - 1,5 - benzothiazepin-4(5H)-one are obtained. Yield 83.2%. The resulting crystals are recrystallized from ether to yield crystals melting at 131–132° C. Hydrobromide: M.P. 153–154° C.

*Analysis.*—Calculated for $C_{23}H_{29}O_5N_2SBr$ (percent): C, 52.47; H, 5.56; N, 5.33. Found (percent): C, 52.65; H, 5.60; N, 5.35.

What we claim is:
1. A compound of the formula

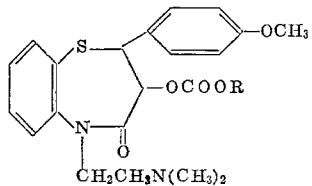

wherein R represents lower alkyl, and pharmaceutically acceptable acid salts thereof.

2. 2 - (4 - methoxyphenyl) - 3 - ethoxycarbonyloxy-5-(β-dimethylaminoethyl) - 2,3 - dihydro -1,5-benzothiazepin-4(5H)-one and pharmaceutically acceptable acid addition salts thereof.

3. 2 - (4 - methoxyphenyl) - 3 - ethoxycarbonyloxy-5-(β-dimethylaminoethyl)-2,3 - dihydro - 1,5 - benzothiazepin-4(5H)-one hydrohalide.

References Cited

UNITED STATES PATENTS 3,155,649  11/1964  Krapcho et al. ____ 260—239.3

FOREIGN PATENTS 1,805,714  6/1969  Germany.

HENRY R. JILES, Primary Examiner

R. T. BOND, Assistant Examiner

U.S. Cl. X.R.

424—275